(12) United States Patent
Sazawa

(10) Patent No.: US 10,625,946 B2
(45) Date of Patent: Apr. 21, 2020

(54) MAGNETIC CHIP CONVEYOR

(71) Applicant: Shounan Engineering Inc., Kagoshima (JP)

(72) Inventor: Masaji Sazawa, Kagoshima (JP)

(73) Assignee: Shounan Engineering Inc., Kagoshima (JP)

( * ) Notice: Subject to any disclaimer, the term of this patent is extended or adjusted under 35 U.S.C. 154(b) by 0 days.

(21) Appl. No.: 16/313,471

(22) PCT Filed: Jun. 30, 2017

(86) PCT No.: PCT/JP2017/027237
§ 371 (c)(1),
(2) Date: Dec. 27, 2018

(87) PCT Pub. No.: WO2018/003990
PCT Pub. Date: Jan. 4, 2018

(65) Prior Publication Data
US 2019/0241368 A1    Aug. 8, 2019

(30) Foreign Application Priority Data
Jun. 30, 2016    (JP) .................................. 2016-130844

(51) Int. Cl.
*B65G 17/00* (2006.01)
*B65G 54/02* (2006.01)
(Continued)

(52) U.S. Cl.
CPC ............ *B65G 17/46* (2013.01); *B03C 1/0332* (2013.01); *B03C 1/18* (2013.01); *B03C 1/20* (2013.01);
(Continued)

(58) Field of Classification Search
None
See application file for complete search history.

(56) References Cited

U.S. PATENT DOCUMENTS 2,697,513 A * 12/1954 Krupp .................... B65G 47/71
209/580

FOREIGN PATENT DOCUMENTS

EP         2243730        10/2010
JP       57081010 A   *    5/1982
(Continued)

OTHER PUBLICATIONS

"International Search Report (Form PCT/ISA/210)" of PCT/JP2017/024237, dated Aug. 1, 2017, with English translation thereof, pp. 1-4.

(Continued)

*Primary Examiner* — Kavel Singh
(74) *Attorney, Agent, or Firm* — JCIP Global Inc.

(57) ABSTRACT

A magnetic chip conveyor of the present invention reduces the possibility that both end portions of a long chip are adsorbed by two or more types of magnets having different magnetic forces, so that a long chip does not remain. An endless chain is disposed on the rear surface of a plate, so as to be wound around sprocket wheels. The sprocket wheel is rotated in the counterclockwise direction by a motor, and the endless chain rotates in the counterclockwise direction. Twelve magnet holders are fixed to the endless chain at equal intervals. Three types of permanent magnets having different magnetic forces are bonded and fixed to the magnet holders.

5 Claims, 4 Drawing Sheets

(51) Int. Cl.
*B65G 17/46* (2006.01)
*B03C 1/18* (2006.01)
*B23B 25/00* (2006.01)
*B23Q 11/00* (2006.01)
*B03C 1/20* (2006.01)
*B03C 1/033* (2006.01)

(52) U.S. Cl.
CPC .............. *B23B 25/00* (2013.01); *B23Q 11/00* (2013.01); *B65G 54/02* (2013.01); *B03C 2201/20* (2013.01)

(56) References Cited

FOREIGN PATENT DOCUMENTS

| | | |
|---|---|---|
| JP | S57177548 | 11/1982 |
| JP | S60212253 | 10/1985 |
| JP | H10151362 | 6/1998 |
| JP | 2001113200 | 4/2001 |
| JP | 2003033676 | 2/2003 |
| JP | 2016014184 | 1/2016 |
| JP | 2016036874 | 3/2016 |

OTHER PUBLICATIONS

"Office Action of China Counterpart Application," with machine English translation thereof, dated Dec. 3, 2019, p. 1-p. 10.

\* cited by examiner

MAGNETIC CHIP CONVEYOR

CROSS-REFERENCE TO RELATED APPLICATION

This application is a 371 application of the international PCT application serial no. PCT/JP2017/024237, filed on Jun. 30, 2017, which claims the priority benefits of Japan application no. 2016-130844, filed on Jun. 30, 2016. The entirety of each of the abovementioned patent applications is hereby incorporated by reference herein and made a part of this specification.

TECHNICAL FIELD

The present invention relates to a magnetic chip conveyor. More specifically, the present invention relates to a magnetic chip conveyor for preventing a long chip such as that generated by a lathe from remaining.

BACKGROUND ART

Magnetic chip conveyors, which are configured such that a magnetic chip is placed on the front surface of a non-magnetic plate, a plurality of magnets mounted to an endless chain on the rear surface of the plate are moved from one end of the plate to the other end thereof so that the chip is dropped from the other end of the plate, are known (Patent Literature 1, Patent Literature 2, Patent Literature 3). Such magnetic chip conveyors are preferred because chips generated during processing can be separated from coolant and discharged and coolant is less frequently carried to the outside.

In the conventional magnetic chip conveyors, however, when a long chip such as a chip generated by a lathe is generated, adsorption forces that adsorb both end portions of a long chip simultaneously by magnetic force by the magnets on the upstream side and the downstream side of the endless chain, the frictional force between a conveyance surface and the chip, and the force of gravity of the chip may be balanced with a given probability. In such a case, there is a problem in that the long chip does not move on the front surface of the non-magnetic plate and the long chip remains on the front surface of the non-magnetic plate.

CITATION LIST

Patent Literature

[Patent Literature 1] Japanese Patent Application Publication No. 2001-113200
[Patent Literature 2] Japanese Patent Application Publication No. 2016-36874
[Patent Literature 3] Japanese Patent Application Publication No. H10-151362

SUMMARY OF INVENTION

Technical Problem

The present invention has been made in view of the circumstances described above, and achieves the following object. It is an object of the present invention to provide a magnetic chip conveyor for preventing a long chip from remaining.

Solution to Problem

In order to solve the above-mentioned problem, the present invention employs the following measures.

A magnetic chip conveyor in a first aspect of the present invention includes: a plate made of a non-magnetic material, configured to make a chip of magnetic material be placed on a front surface of the plate, guide the chip from one end of the plate to other end of the plate, and discharge the chip to the other end; a plurality of magnets, disposed on a rear surface of the plate at constant intervals along a direction from the one end to the other end, and adsorbing the chip on the front surface of the plate; and a magnet movement mechanism, configured to simultaneously move the plurality of magnets from the one end to the other end, so as to move the chip from the one end to the other end, wherein the magnets are disposed, such that the magnets having different magnetic forces are adjacent to each other.

According to a magnetic chip conveyor in a second aspect of the present invention, in the first aspect of the present invention, the magnets are a group of magnets made of unit magnets.

According to a magnetic chip conveyor in a third aspect of the present invention, in the first or second aspect of the present invention, the magnet movement mechanism is a caterpillar track configured to transmit power from a driving wheel to a driven wheel.

According to a magnetic chip conveyor in a fourth aspect of the present invention, in the first or second aspect of the present invention, the front surface near the other end has unevenness.

According to a magnetic chip conveyor in a fifth aspect of the present invention, in the second aspect of the present invention, the group of magnets are firmly fixed to magnet holders mounted to the magnet movement mechanism at equal intervals in a movement direction of the magnet movement mechanism, and the magnets are disposed such that the unit magnets adjacent to each other in the movement direction of the magnet movement mechanism have different thicknesses.

Advantageous Effects of Invention

In the magnetic chip conveyor of the present invention, the magnetic forces of adjacent magnets are different, and hence a long chip is less likely to be adsorbed by the magnets on the upstream side and the downstream side of the magnet movement mechanism, and a problem in that a long chip remains on the front surface of the non-magnetic plate does not occur.

BRIEF DESCRIPTION OF DRAWINGS

FIG. 4A and FIG. 4B illustrate the vicinity of a chip drop portion at a left end of a plate made of a non-magnetic material in FIG. 1, in which
FIG. 4A is an enlarged vertical cross-sectional view,
and FIG. 4B is a plan view of FIG. 4A.

DESCRIPTION OF EMBODIMENTS

Figure 1:
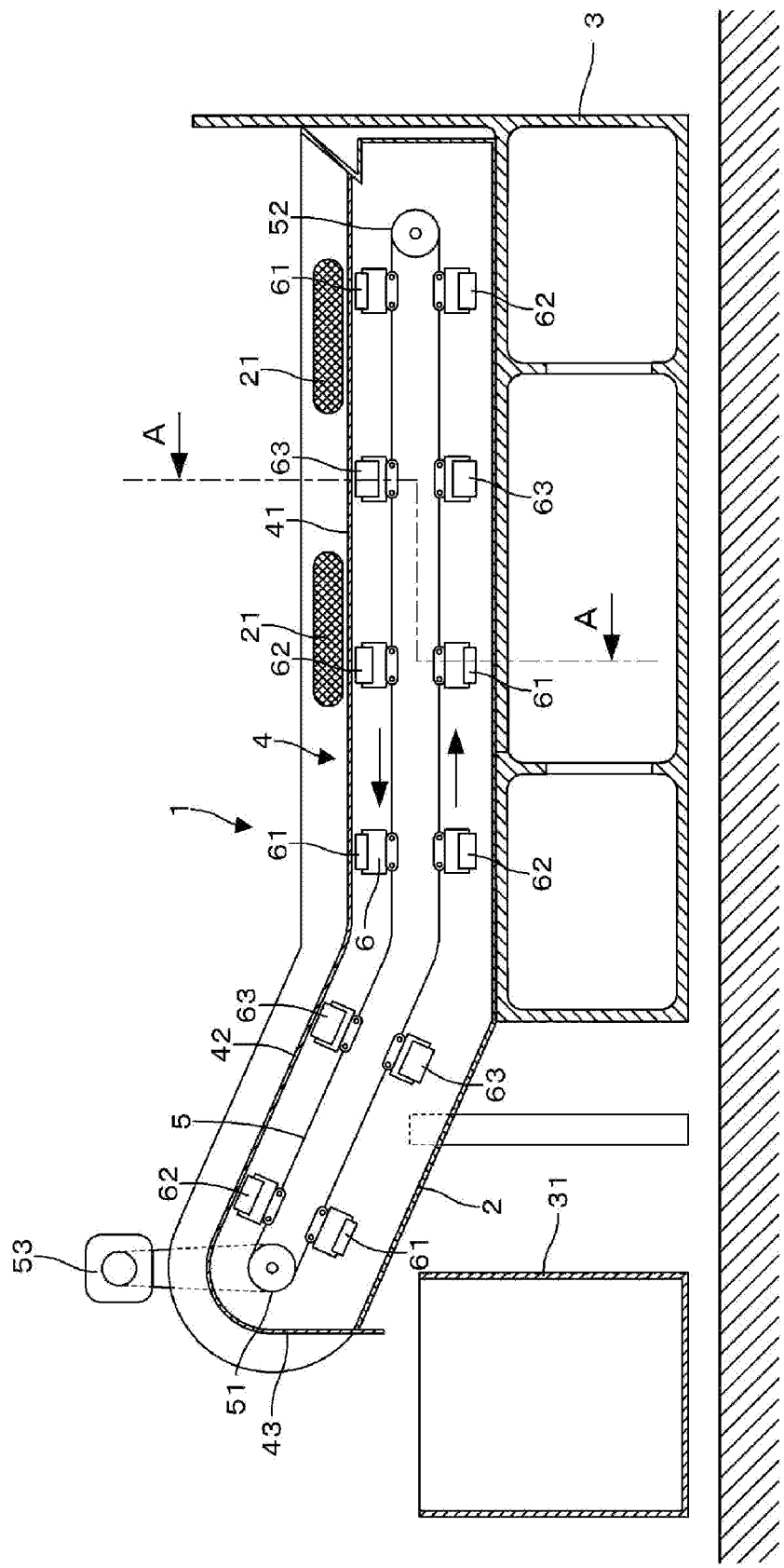
FIG. 1 is an overall vertical cross-sectional view illustrating a magnetic chip conveyor according to an embodiment of the present invention.
Figure 2:
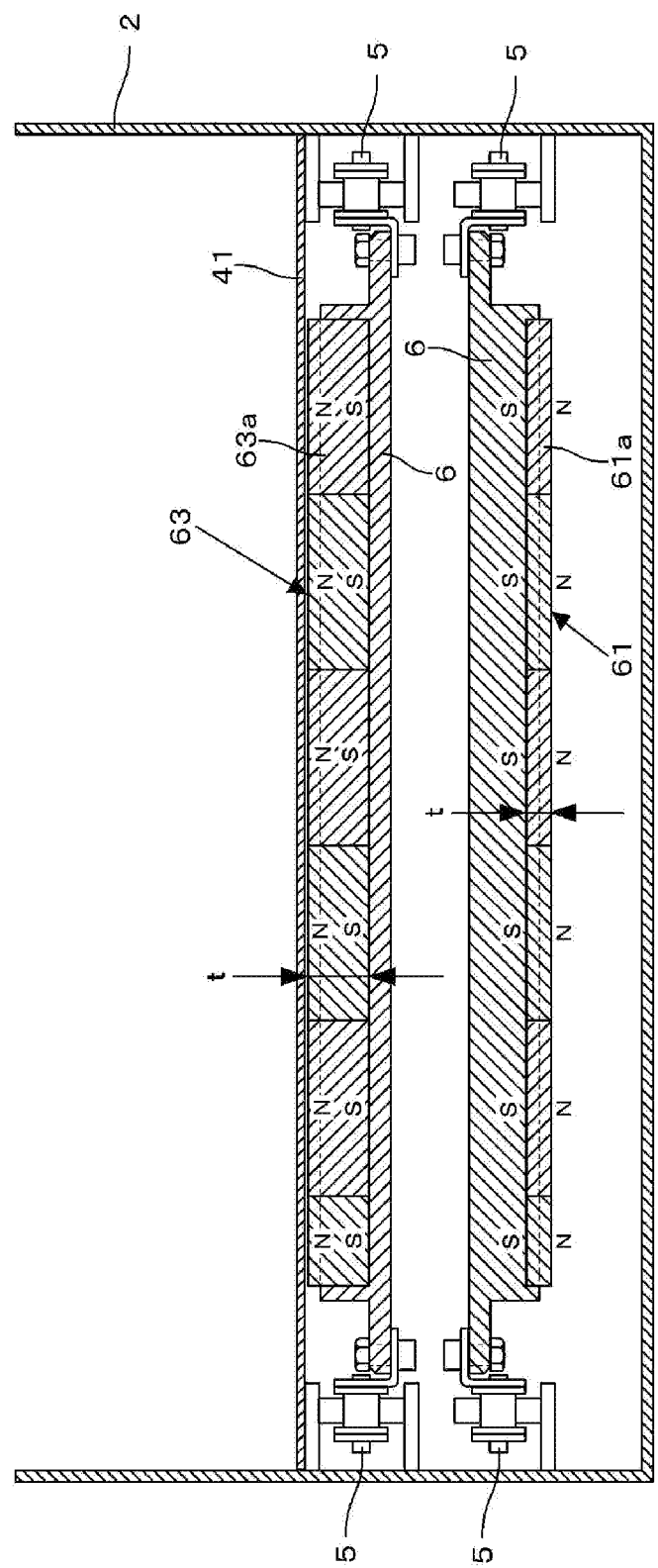
FIG. 2 is a cross-sectional view taken along the line A-A in FIG. 1.
Figure 3:
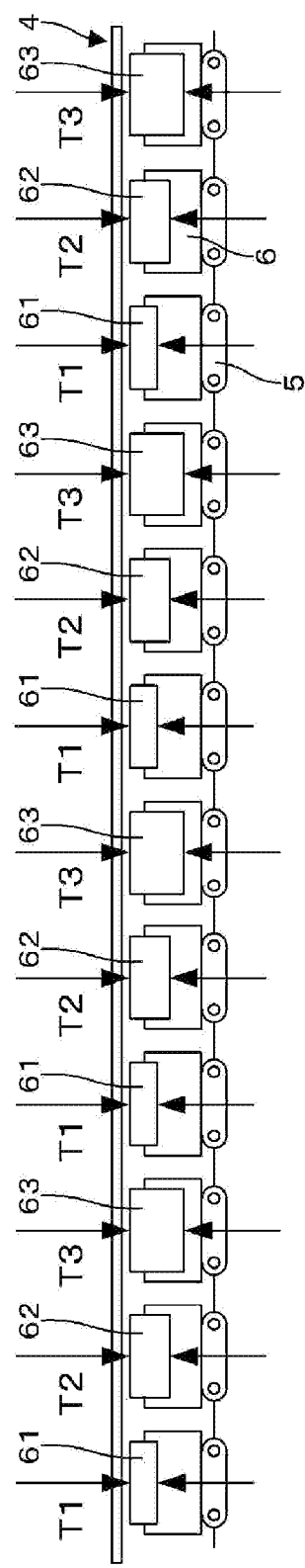
FIG. 3 is an exploded view of an endless chain in FIG. 1.
Figure 4A:
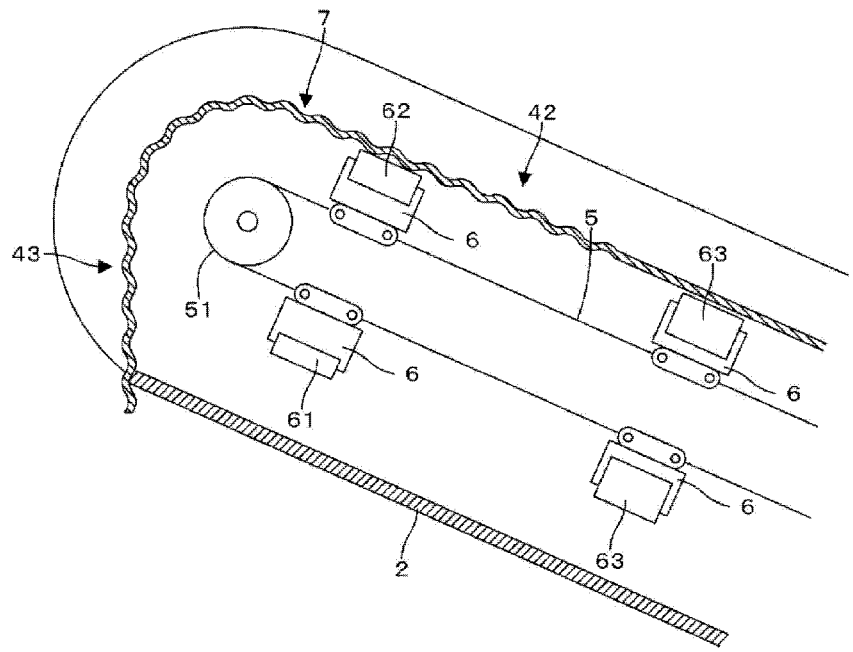
Figure 4B:
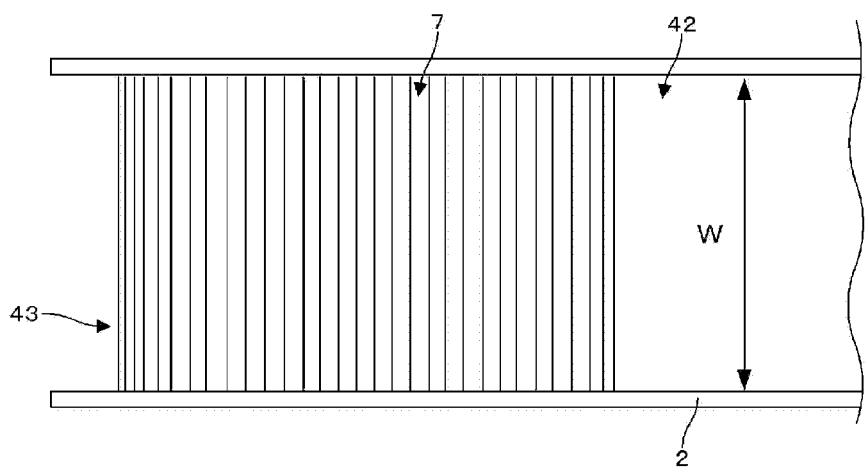

Embodiments of the present invention are described below with reference to the drawings. FIG. 1 is an overall vertical cross-sectional view illustrating a magnetic chip conveyor according to an embodiment of the present invention. FIG. 2 is a cross-sectional view taken along the line A-A in FIG. 1. FIG. 3 is an exploded view of an endless chain in FIG. 1. FIG. 4A and FIG. 4B illustrate the vicinity of a chip drop portion at a left end of a plate made of a non-magnetic material in FIG. 1. FIG. 4A is an enlarged vertical cross-sectional view, and FIG. 4B is a plan view of FIG. 4A. A magnetic chip conveyor 1 in the embodiment of the present invention includes a box-shaped chip conveyor main body 2 elongated in the left-right direction in FIG. 1. The chip conveyor main body 2 in this example is mounted and placed on a bed 3 of a machine tool. A plate 4, which is a thin plate made of the non-magnetic material (such as SUS304) and has a smooth front surface, is integrally and fixedly disposed on the top of the chip conveyor main body 2. The plate 4 includes a horizontal portion 41, an inclined portion 42, and a chip drop portion 43.

In this installation example, the horizontal portion 41 is a belt-like substantially horizontal surface. The inclined portion 42 is an inclined surface that continuously rises from the horizontal surface. The chip drop portion 43 constitutes a vertical surface from the inclined surface through an arc surface. The plate 4 serves as a discharge path of chips and also a cover of an endless chain 5. A chip of a magnetic material that has dropped on the front surface of the horizontal portion 41 of the plate 4 together with working liquid is adsorbed by a permanent magnet 61, 62, or 63 of the endless chain 5 disposed on the rear surface of the plate 4, and adsorbed on the horizontal portion 41. The chip moves to the left illustrated in FIG. 1, and at the inclined portion 42, coolant is caused to flow downward by the force of gravity such that the chip is separated. The separated chip drops into a chip box 31 from the chip drop portion 43 extending downward from the left end of the inclined portion 42.

On the other hand, coolant that has dropped on the front surface of the horizontal portion 41 together with a chip flows out of punching metals 21, 21 on the side surfaces of the chip conveyor main body 2, and returns toward a coolant tank which is not shown in the machine tool. The endless chain 5 is disposed on the rear surface of the plate 4, so as to be wound around sprocket wheels 51 and 52. The sprocket wheel 51 on the left end is rotated by a motor 53, and the endless chain 5 rotates in the counterclockwise direction in FIG. 1. In this example, twelve magnet holders 6 are fixed to the endless chain 5 at equal intervals. In this example, the permanent magnets (such as rare-earth permanent magnets) 61, 62, and 63 having a rectangular parallelepiped shape or a cubic shape and made of three types of unit magnets having different magnetic forces are bonded and fixed to the magnet holders 6. In other words, each of the permanent magnets 61, 62, and 63 constitutes a magnet by combining a group of unit magnets.

As illustrated in FIG. 2, the permanent magnet 61 in this example is made of a group of six unit magnets 61a, and the permanent magnet 63 in this example is made of a group of six unit magnets 63a. It is known that the magnetic force (surface magnetic flux density, adsorption force) increases as the thickness of the magnet increases until the surface magnetic flux density is saturated. Specifically, as illustrated in FIG. 3, the permanent magnets 61 having a thickness T1, the permanent magnets 62 having a thickness T2, and the permanent magnets 63 having a thickness T3 are bonded and fixed to the magnet holders 6 in this order from the left side as illustrated in FIG. 3. As illustrated in FIG. 2, in this example, the permanent magnets 61, 62, and 63 are each constituted by arranging six unit magnets having a rectangular parallelepiped shape in the left-right direction in FIG. 2. In the embodiment of the present invention, T1 has a thickness of 6 mm, T2 has a thickness of 9 mm, and T3 has a thickness of 15 mm. Each of the permanent magnets 61, 62, and 63 is fixedly disposed on the magnet holder 6 such that the magnetic poles are oriented in the same direction. The permanent magnet 61 has a magnetic force (magnetic flux density) of 3,000 G (gauss), the permanent magnet 62 has a magnetic force of 4,000 G (gauss), and the permanent magnet 63 has a magnetic force of 5,000 G (gauss).

The magnetic force is proportional to the size of a thickness t (see FIG. 2) when the size of the flat surface of the magnet is constant. The permanent magnets 61, 62, and 63 are fixedly disposed at constant intervals in a movement direction of the endless chain 5 (see FIG. 3). The permanent magnets 61, 62, and 63 are each made of a plurality of magnets (see FIG. 2). In each of the permanent magnets 61, 62, and 63, magnets disposed in a direction orthogonal to the movement direction of the endless chain 5 have the same magnetic force. However, the permanent magnets 61, 62, and 63 have different thicknesses, and hence the magnitudes of the magnetic forces are different between permanent magnets adjacent to each other in the movement direction of the endless chain 5 (see FIG. 3). When the endless chain 5 is rotated in the counterclockwise direction in FIG. 1 by the motor 53, the permanent magnets 61, 62, and 63 are moved to the left in FIG. 1 along the rear surface of the plate 4.

In this case, chips on the front surface of the plate 4 are adsorbed by the permanent magnets 61, 62, and 63 and moved to the left in FIG. 1. The endless chain 5 is inverted at the position of the sprocket wheel 51 on the left end illustrated in FIG. 1, and the permanent magnets 61, 62, and 63 are separated away from the chip drop portion 43, and hence the chips lose the magnetic force and drop into the chip box 31 from the chip drop portion 43. In the embodiment of the present invention, adjacent permanent magnets 61, 62, and 63 have different magnetic forces, and hence the permanent magnets on the upstream side and the downstream side of the endless chain 5 are less likely to adsorb both end portions of a long chip, and a long chip does not remain on the front surface of the non-magnetic plate 4. As illustrated in FIG. 4A and FIG. 4B, in the plate 4, undulating unevenness 7 is formed at the left end of the inclined portion 42 and at the chip drop portion 43. The undulating unevenness 7 is formed over the entire width W of the plate 4.

Consequently, spaces are formed between chips placed on the left end of the inclined portion 42 and the chip drop portion 43 and the front surface of the plate 4. Thus, chips are less likely to adhere to the plate 4 due to coolant and lubricant adhering to the plate 4, and hence the chips easily drop from the chip drop portion 43.

OTHER EMBODIMENTS

While the embodiment of the present invention has been described, the present invention is not limited to the above-mentioned embodiment. The permanent magnets 61, 62, and 63 in the above-mentioned embodiment have a rectangular parallelepiped shape or a cubic shape, but may have another shape such as a columnar shape. The magnetic force of the magnet is adjusted by the thickness, but the magnetic force may be adjusted by the number of magnets or the material of the magnet. Further, the endless chain in the above-mentioned embodiment may be an endless belt instead of the chain. In addition, the endless chain and the endless belt are one type of caterpillar tracks, but a reciprocating mechanism may be used instead of the caterpillar track in order to reduce the size.

Specifically, the magnet is subjected to rectangular motion by a link mechanism or a cam mechanism so that a chip is fed to one side. In this case, in the return operation, a slight gap needs to be provided between the rear surface of the plate 4 and the magnet in order to prevent the reverse flow of chips due to the influence of magnetic force. In this case, the chip remains on the front surface of the plate 4 owing to frictional force and does not fall unless the plate 4 is greatly inclined. In the above-mentioned embodiment, three types of permanent magnets having different magnetic forces are provided, but two types or four or more types of permanent magnets may be provided. The unevenness of the plate is formed in an undulating manner, but may have another shape. In addition, in the above-mentioned embodiment, the permanent magnet is used to adsorb a chip, but an electromagnet may be used.

REFERENCE SIGNS LIST

1 Magnetic chip conveyor
2 Chip conveyor main body
21 Punching metal
3 Bed
31 Chip box
4 Plate
41 Horizontal portion
42 Inclined portion
43 Chip drop portion
5 Endless chain
51, 52 Sprocket wheel
53 Motor
6 Magnet holder
61, 62, 63 Permanent magnet
7 Unevenness

The invention claimed is:

1. A magnetic chip conveyor, comprising:
a plate made of a non-magnetic material, configured to make a chip of a magnetic material be placed on a front surface of the plate, guide the chip from one end of the plate to other end of the plate, and discharge the chip to the other end;
a plurality of magnets, disposed on a rear surface of the plate at constant intervals along a direction from the one end to the other end, and adsorbing the chip on the front surface of the plate; and
a magnet movement mechanism, configured to simultaneously move the plurality of magnets from the one end to the other end, so as to move the chip from the one end to the other end,
wherein the magnets are disposed, such that the magnets having different magnetic forces are adjacent to each other,
wherein the front surface of the plate near the other end is uneven having an undulating topography.

2. The magnetic chip conveyor according to claim 1, wherein
the magnets are a group of magnets made of unit magnets.

3. The magnetic chip conveyor according to claim 1, wherein
the magnet movement mechanism is a caterpillar track configured to transmit power from a driving wheel to a driven wheel.

4. The magnetic chip conveyor according to claim 2, wherein
the group of magnets are firmly fixed to magnet holders mounted to the magnet movement mechanism at equal intervals in a movement direction of the magnet movement mechanism; and
the magnets are disposed such that the unit magnets adjacent to each other in the movement direction of the magnet movement mechanism have different thicknesses.

5. The magnetic chip conveyor according to claim 2, wherein
the magnet movement mechanism is a caterpillar track configured to transmit power from a driving wheel to a driven wheel.

* * * * *